United States Patent [19]
Schmitt

[11] Patent Number: 5,599,056
[45] Date of Patent: Feb. 4, 1997

[54] ARTICULATED CONNECTION OF TWO ADJOINING COMPONENTS, PARTICULARLY OF A VEHICLE TOP

[75] Inventor: Hans-Juergen Schmitt, Muehlacker, Germany

[73] Assignee: Dr. Ing. h.c.F. Porsche AG, Weissach, Germany

[21] Appl. No.: 490,574

[22] Filed: Jun. 15, 1995

[30]　　Foreign Application Priority Data

Jun. 15, 1994 [DE]　Germany ........................ 44 20 844.8

[51] Int. Cl.⁶ ............................................. B60J 7/08
[52] U.S. Cl. ................ 296/122; 16/259; 16/273; 384/296; 384/275; 403/155; 403/158
[58] Field of Search ..................... 296/121, 122, 296/116, 107; 16/254, 255, 257, 259, 273; 384/296, 275; 403/79, 157, 158, 154, 155

[56]　　　References Cited

U.S. PATENT DOCUMENTS

| | | | |
|---|---|---|---|
| 2,422,327 | 6/1947 | Winslow | 403/154 X |
| 3,193,335 | 7/1965 | Wing | 384/296 |
| 4,573,732 | 3/1986 | Muscat | 296/108 |
| 4,951,349 | 8/1990 | Dietrich et al. | 16/228 |
| 5,463,795 | 11/1995 | Carlson et al. | 16/273 |

FOREIGN PATENT DOCUMENTS 651973　10/1937　Germany ........................ 296/121

*Primary Examiner*—David M. Mitchell
*Assistant Examiner*—Kia M. Robinson
*Attorney, Agent, or Firm*—Evenson, McKeown, Edwards & Lenahan, P.L.L.C.

[57]　　　ABSTRACT

A first, fork-shaped component accommodates a second component, in which case an articulated connection between the two components takes place by means of an inserted pin. In order to establish a rattle-free connection between the two components with a good functioning and a simple mounting and a small space requirement in the longitudinal direction of the pin, it is provided that one sleeve respectively, which receives the pin, is inserted into bores of the first fork-shaped component, on the side facing the second component, each sleeve having an outwardly directed, elastic ring segment which, under prestress, is supported on the two components. In addition, on the side facing away from the ring segment, inwardly directed elastic noses are molded to the sleeves and reach behind the slid-in pin without a head and secure it against a falling-out.

12 Claims, 2 Drawing Sheets

5,599,056

ARTICULATED CONNECTION OF TWO ADJOINING COMPONENTS, PARTICULARLY OF A VEHICLE TOP

BACKGROUND AND SUMMARY OF THE INVENTION

This invention relates to an articulated connection of two adjoining components of a vehicle top.

From U.S. Pat. No. 4,573,732, it is known to connect a first component of a vehicle top, which has a fork-shaped design on its end area, with a second component in an articulated manner by means of a pin. On one end, the pin has a head section which is supported on the exterior side of one arm of the first component. A shaft area of the pin extends through bores of both components and projects beyond the second arm of the first component, a securing ring being fitted onto the projecting area. Because of the axial play between the two components, disturbing rattling noises will occur in the case of this connection. Because of the head section and the projecting area—viewed in the longitudinal direction—, the pin also requires a relatively large space.

It is an object of the invention to further develop an articulated connection of two adjoining components in such a manner that, while the operation is good, the mounting is simple, the required space is small, and a rattle-free connection is provided between the two components in the longitudinal direction of the pin to be connected, in which case a loosening or falling-out of the pin is reliably prevented.

According to the invention, this object is achieved by means of providing an articulated connection of first and second adjoining components of a folding vehicle convertible top, the second component being inserted into a recess of the fork-shaped first component and aligned bores being arranged on both components through which bores a pin without a head is guided which connects the two components with one another, wherein one sleeve respectively which receives the pin is inserted into the two bores of the fork-shaped first component, each sleeve having an outwardly directed elastic ring segment on its side facing the second component, said elastic ring segment being supported on the two components, and wherein inwardly directed noses are molded to the sleeves on the side facing away from the second component, which noses reach behind the pushed-in pin without a head and secure the pin with respect to a falling-out.

Principal advantages achieved by means of the invention are that, by mounting sleeves between the pin having no head and the bores of the first fork-shaped component, a rattle-free connection is provided between two adjoining components because elastic, truncated-cone-shaped ring segments of the sleeves compensate the axial play between the two components. Because of the construction of the pin without a head, this connection—viewed in the longitudinal direction of the pin—requires relatively little space.

Elastic noses molded onto the two sleeves, on the one hand, permit the easy introduction of the pin and, on the other hand, secure the pushed-in pin reliably with respect to a falling-out so that the pin cannot loosen on its own. Securing elements for the pins, such as securing rings, or the like, are not required. The sleeves, which are made of plastic, can be easily and cost-effectively produced in the injection molding process and can be mounted in a simple and rapid manner.

Other objects, advantages and novel features of the present invention will become apparent from the following detailed description of the invention when considered in conjunction with the accompanying drawings.

DETAILED DESCRIPTION OF THE DRAWINGS

Figure 2:
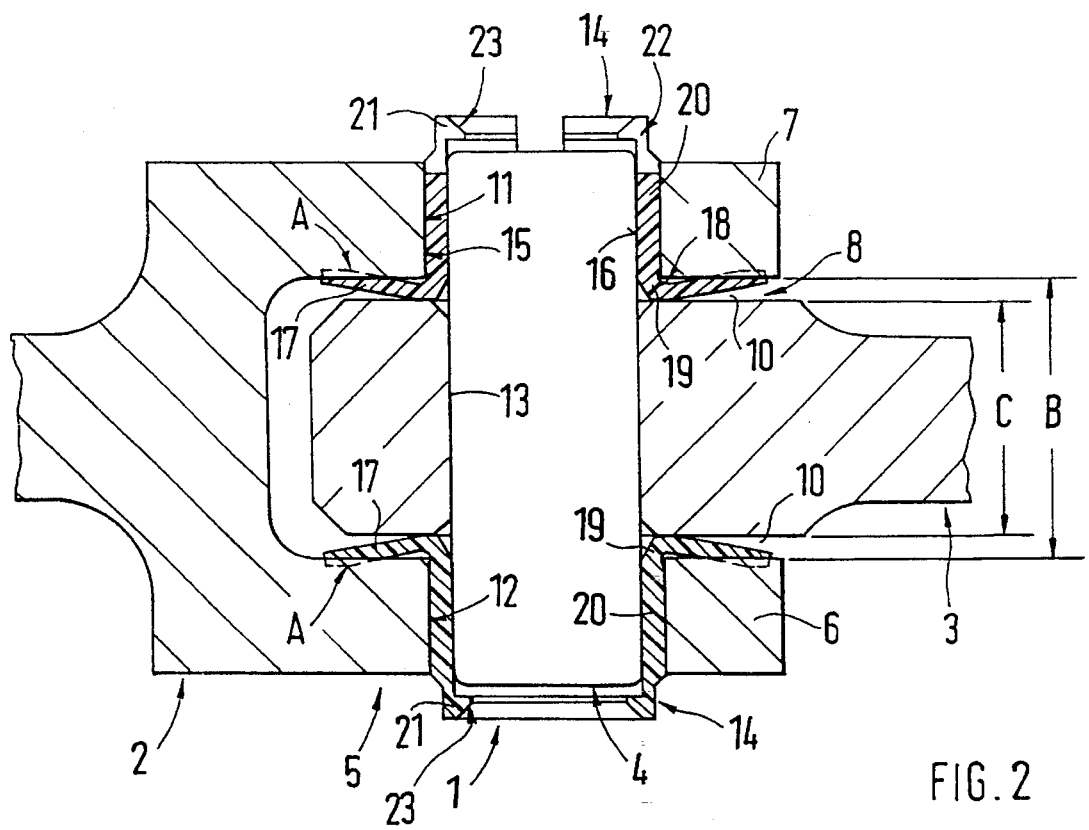
FIG. 2 is an enlarged sectional view taken along Line II—II of FIG. 1 of the articulated connection of two adjoining components of the folding top.

FIG. 2 illustrates an articulated connection 1 of two adjoining components 2, 3 by means of a pin 4.

The first fork-shaped component 2 comprises two spaced webs 6, 7 in the common connection area 5, a recess 8 extending between the two webs 6, 7. In the embodiment shown, the webs 6, 7 are aligned upright and, in the end area—in the lateral view—have an approximately circular cross-sectional expansion 9.

The recess 8 is constructed to be open toward the second component 3, in which case the width "B" of the recess 8 is larger than the thickness C of the second component 3. As a result, one gap 10 respectively extends on either side of the second component 3.

The second component 3 projects in sections into the recess 8 of the first component 2. On both webs 6, 7 of the first component 2 and on the second component 3, aligned bores 11, 12, 13 are provided through which the pin 4 extends.

For achieving an easy-motion, rattle-free articulated connection between the two components 2, 3, a sleeve 14 is inserted into each bore 11, 12 of the first component 2. The two sleeves 14, which are preferably made of plastic, are each introduced through the recess 8 and are then inserted into the bores 11, 12. According to FIG. 2, the sleeve 14 rests by means of its cylindrical outer surface 15 on the corresponding cylindrical inner surface of the bore 11 or 12. The cylindrical inner surfaces 16 of the sleeve 14 receive the slid-in pin 4, rattle free snug fits being provided between the sleeve 14 and the pin 4. The bores 11, 12 have a larger diameter than the bore 13 of the second component 3.

On the side facing the second component 3, according to the invention, the sleeve 14 has an outwardly projecting elastic ring segment 17 which is supported under prestress on the two components 2, 3 and compensates the axial play between the components 2, 3.

By way of a diagonally extending section 19, which is provided with a cross-sectional reduction 18, the elastic ring segment 17 is connected to the hollow-cylindrical area 20. In the manufacturing position A, the ring segment 17—in the cross-sectional view—has a diagonal position in such a manner that an inner edge area is supported on the outer side of the second component 3, whereas the outer edge area interacts with the first component 2 in a supporting manner.

The ring segment 17 will deform in the mounting position and extend inside the gap 10 approximately in parallel to the adjoining walls of the two components 2, 3. The pin 4 is formed by a pin without a head which is received in the two sleeves 14 and in the bore 13 of the second component 3 situated in-between. The pin 4 is preferably fixedly, that is, non-rotatably, connected with the bore 13.

For the axial securing of the pin 4, the sleeves 14 have inwardly directed elastic noses 21 which reach in sections behind the pin 4, on the side facing away from the second component 3. Preferably, several radially arranged, inwardly directed noses 21 are distributed along the circumference of the sleeve 4 on the hollow-cylindrical area 20, which noses 21 are separated by recesses 22 therebetween.

Figure 3:
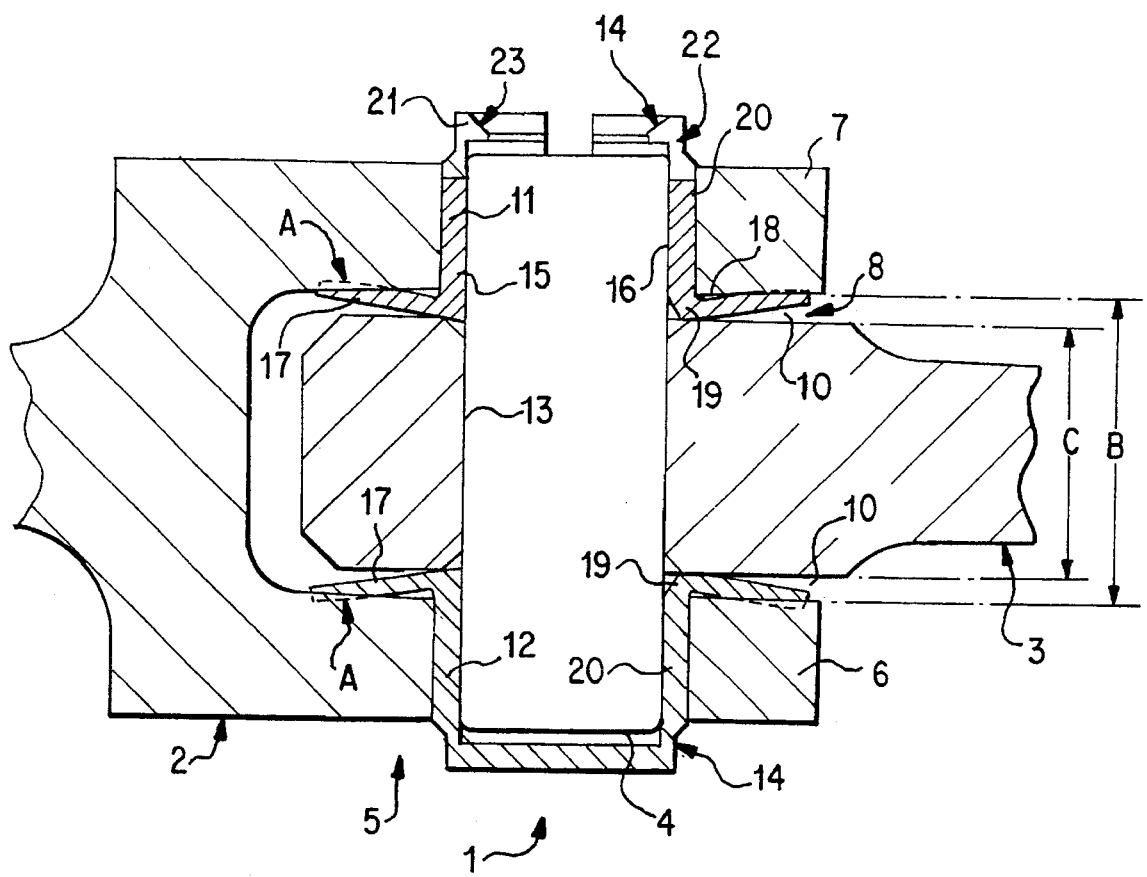
FIG. 3 is another embodiment similar to FIG. 2 but having one sleeve closed at its bottom.

The elastic noses 21 have a stop bevel 23 for an easier introduction of the pin 4 and move radially toward the outside when the pin 4 is introduced. After the passing of the pin 4, the noses 21 automatically move back toward the interior. The length of the pin 4 is slightly smaller than the receiving space defined by the two spaced sleeves 14. In the embodiment shown, identically constructed sleeves 14 are inserted into both bores 11, 12. However, it is also contemplated that one of the two used sleeves 14, may have, instead of the elastic noses 21, a closed bottom section for fixing the pin (FIG. 3).

Figure 1:
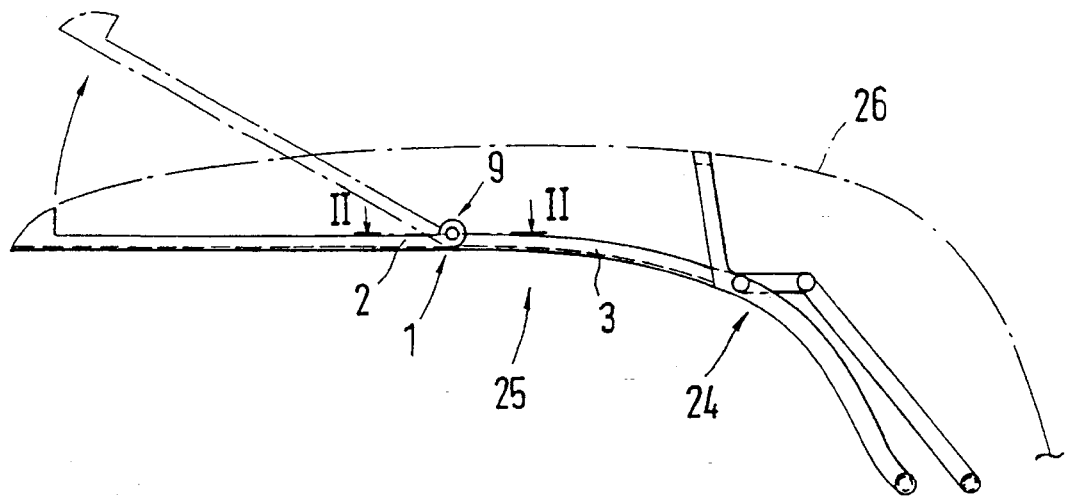
FIG. 1 is a view of a folding top linkage in the closed condition constructed according to embodiments of the present invention.

In the embodiment shown (FIG. 1), the components 2, 3, which are to be connected in an articulated manner, are formed by adjoining folding top control arms of a folding top structure 24. The folding top 25 comprises an elastic folding top cover 26 and the folding top structure 24. However, the articulated connection 1 according to the invention is not limited to a top but can be used in all cases in which a fork-shaped first component 2 accommodates a second component 3 and a pin 4 is provided for connecting the two components 2, 3.

In contrast to a riveted joint, this articulated connection can be released in a limited manner and can easily by mounted by means of an auxiliary tool.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Articulated connection of first and second adjoining components of a folding vehicle convertible top, the second component being inserted into a recess of the fork-shaped first component and aligned bores being arranged on both components through which bores a pin without a head is guided which connects the two components with one another, wherein one sleeve respectively which receives the pin is inserted into the two bores of the fork-shaped first component, each sleeve having an outwardly directed elastic ring segment on its side facing the second component, said elastic ring segment being abuttingly supported under pre-stress against the two components to compensate for axial play between the first and second components, and wherein inwardly directed noses are molded to the sleeves on the side facing away from the second component, which noses reach behind ends of the pushed-in pin without a head and secure the pin with respect to a falling-out.

2. Articulated connection according to claim 1, wherein the recess between the forks of the first component has a larger width than the thickness of the second component, the thus formed gap between the two components being compensated by the elastic ring segments of the two sleeves.

3. Articulated connection according to claim 1, wherein the elastic ring segment is connected to a hollow-cylindrical area of the sleeve by way of a diagonally extending section which is provided with a cross-sectional reduction.

4. Articulated connection according to claim 2, wherein the elastic ring segment is connected to a hollow-cylindrical area of the sleeve by way of a diagonally extending section which is provided with a cross-sectional reduction.

5. Articulated connection according to claim 1, wherein a snug fit is provided between an outer surface of the pin and a surrounding inner surface of the sleeve.

6. Articulated connection according to claim 1, wherein the pin is fixedly connected with the second component.

7. Articulated connection according to claim 1, wherein the inwardly directed noses are radially arranged on the sleeve and are molded to the hollow-cylindrical area and are distributed along the circumference on the sleeve, the hollow-cylindrical area being locally provided with recesses between the spaced noses.

8. Articulated connection according to claim 3, wherein the inwardly directed noses are radially arranged on the sleeve and are molded to the hollow-cylindrical area and are distributed along the circumference on the sleeve, the hollow-cylindrical area being locally provided with recesses between the spaced noses.

9. Articulated connection according to claim 4, wherein the inwardly directed noses are radially arranged on the sleeve and are molded to the hollow-cylindrical area and are distributed along the circumference on the sleeve, the hollow-cylindrical area being locally provided with recesses between the spaced noses.

10. Articulated connection according to claim 9, wherein a snug fit is provided between an outer surface of the pin and a surrounding inner surface of the sleeve.

11. Articulated connection of first and second adjoining components of a folding vehicle convertible top, the second component being inserted into a recess of the fork-shaped first component and aligned bores being arranged on both components through which bores a pin without a head is guided which connects the two components with one another, wherein one sleeve respectively which receives the pin is inserted into the two bores of the fork-shaped first component, each sleeve having an outwardly directed elastic ring segment on its side facing the second component, said elastic ring segment being abuttingly supported under pre-stress against the two components to compensate for axial play between the first and second components, and wherein inwardly directed noses are molded to at least one of the sleeves on the side facing away from the second component, which noses reach behind at least one end of the pushed-in pin without a head and secure the pin with respect to a falling-out.

12. Articulated connection according to claim 11, wherein one of said sleeves has a closed bottom for holding the pin and the other of said sleeves has the noses.

* * * * *